Nov. 24, 1964  L. F. GRIFFITH  3,158,220
CRAWLER ATTACHMENT FOR A TRAIL SCOOTER
Filed May 6, 1963  2 Sheets-Sheet 1

LEE. F. GRIFFITH
INVENTOR.
BY
BUCKHORN, BLORE, KLARQUIST & SPARKMAN
ATTORNEYS

Nov. 24, 1964  L. F. GRIFFITH  3,158,220
CRAWLER ATTACHMENT FOR A TRAIL SCOOTER
Filed May 6, 1963  2 Sheets-Sheet 2
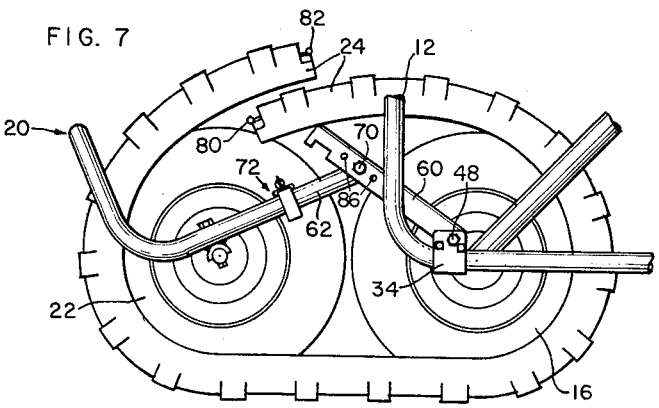
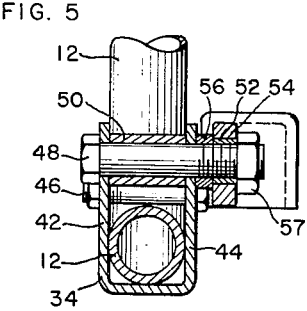
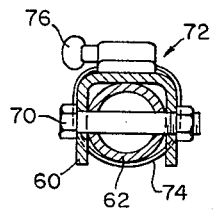
LEE F. GRIFFITH
INVENTOR.
BY
BUCKHORN, BLORE, KLARQUIST & SPARKMAN
ATTORNEYS United States Patent Office 3,158,220
Patented Nov. 24, 1964

3,158,220
CRAWLER ATTACHMENT FOR A
TRAIL SCOOTER
Lee F. Griffith, Portland, Oreg., assignor to
Katagote, Inc., a corporation of Oregon
Filed May 6, 1963, Ser. No. 278,038
7 Claims. (Cl. 180—9.24)

The present invention relates to an attachment for land vehicles and more particularly to a crawler attachment for a trail scooter for increasing traction of the same.

Recently two-wheeled motor scooters adapted for trail use have become popular with outdoorsmen and those who work in the woods and mountains for negotiating rough and steep terrain. However, snow, mud, sand, logs and other impediments often make such terrain impassable for such scooters.

It is therefore a primary object of the present invention to provide a new and improved attachment for a motor scooter which converts such scooter into a crawler tractor vehicle for travel over otherwise impassable terrain.

More specifically, it is an object of the invention to provide a new and improved crawler attachment for a motor scooter including a subframe pivotally attached to the frame of the scooter, an idler wheel mounted on such subframe rearwardly of the rear driving wheel of the scooter, and an endless crawler tread trained about both such wheels.

Another object of the present invention is to provide a new and improved crawler attachment in which the subframe has side members that are pivotally attached to the frame of the scooter at a point slightly above the axis of rotation of the driven rear wheel so that the idler wheel hugs the ground when the scooter is in motion.

A further object of the invention is to provide a new and improved crawler attachment in which each side member is hinged at its mid-portion and in which the crawler tread itself is detachably connected together to facilitate mounting and removal of such tread.

The foregoing and other objects and advantages of the present invention will be more readily ascertained from inspection of the following specification taken in connection with the accompanying drawing wherein like numerals refer to like parts throughout, while the features of novelty will be more distinctly pointed out in the appended claims.

In the drawings

FIG. 5 is an enlarged sectional view taken along the line 5—5 of FIG. 4;

FIG. 6 is an enlarged sectional view taken along the line 6—6 of FIG. 4; and

FIG. 7 is a view showing the frame of the attachment partially collapsed for mounting of the crawler element.

Figure 1:
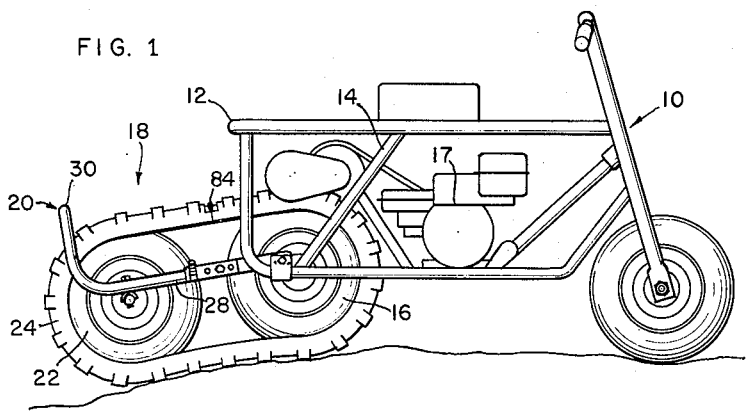
FIG. 1 is a side elevational view of a motor scooter and crawler attachment of the present invention.

With reference first to FIG. 1, illustrated therein is a typical two-wheeled trail scooter 10 having a tubular metal frame 12 including support struts 14 and a read wheel 16 driven by a motor 17. To such a scooter may be secured the crawler attachment of the invention indicated generally at 18. The crawler attachment 18 extends rearwardly of the rear wheel 16 and includes a subframe 20 pivotally attached to the scooter frame 12, an auxiliary idler wheel 22 rotatably mounted on the subframe and an endless crawler element or tread 24 trained about the driven rear wheel 16 of the scooter and the idler wheel 22 of the attachment 18.

Figure 2:
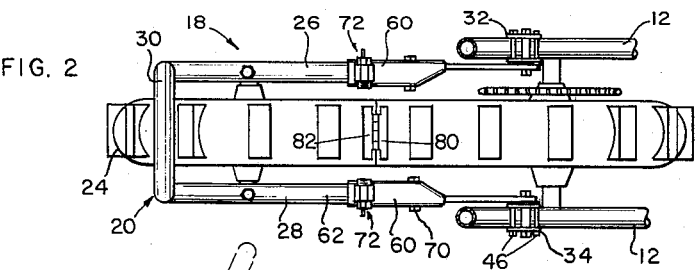
FIG. 2 is a top plan view on a slightly enlarged scale of the crawler attachment and the rear portion of the motor scooter of FIG. 1.
Figure 3:
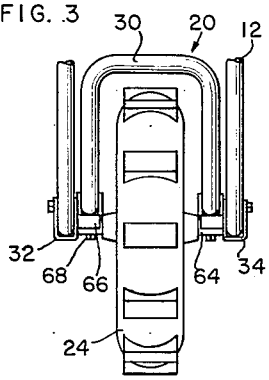
FIG. 3 is an end elevational view of the crawler attachment and the rear portion of the scooter frame of FIG. 1.
Figure 4:
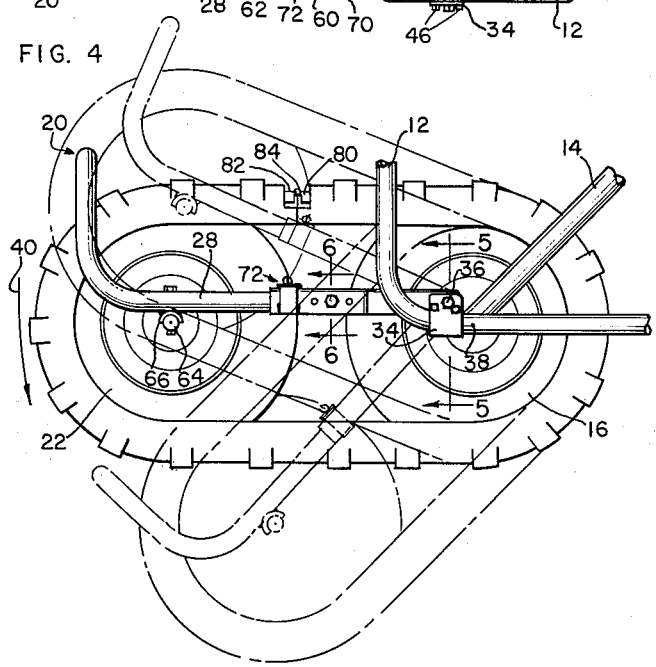
FIG. 4 is a partially diagrammatic side elevational view of the crawler attachment and rear portion of the motor scooter showing the attachment in various operative positions relative to the rear wheel of the scooter.

With reference to FIGS. 2, 3 and 4, the subframe 20 includes a pair of elongate side members 26, 28 extending generally parallel to one another and a U-shaped subframe member 30 which joins together at its ends the pair of side members. The U-shaped member 30 extends angularly upwardly over the idler wheel 22 in a plane generally at right angles to the plane of the side members 26, 28 which configuration gives the subframe more rigidity than if the same member merely curved around the rear of the idler wheel in the same plane as the side members.

The side members 26, 28 are mounted by bracket means 32, 34, respectively, on the scooter frame 12 one on each of the opposite sides of the rear wheel 16 of the scooter for pivotal movement about an axis 36 parallel to the axis of rotation 38 of such rear wheel 16.

As shown in FIG. 4, the axis 36 about which the side members 26, 28 pivot on the frame 12 preferably is positioned rearwardly of and slightly above the axis of rotation 38 of the rear wheel 16 in order that the idler wheel 22 is forced in a downwardly direction indicated by the arrow 40 by the tension induced in the crawler tread. Accordingly, the idler wheel will tend to hug the ground and will not bounce up and down while the scooter is in motion. The positioning of the axis of rotation 36 of the frame 12 above the axis of rotation 38 of the rear wheel causes the distance between the axis 38 and the axis of the rear wheel 22 to increase when the frame 12 swings upwardly thus increasing the tension of the crawler tread. On the other hand when the rear wheel 22 swings downwardly from the position shown in solid lines in FIG. 4, the distance between the axis of rotation 38 and the axis of the wheel 22 decreases thus lessening the tension on the tread 40. The result is that the rear wheel 22 is continually urged downwardly to hug the ground.

With reference to FIG. 5, the bracket 34 is U-shaped in cross section and has just a sufficient interior width between sidewalls 42 and 44 snugly to receive the tubular frame member 12. A pair of bolts 46 removably secure the bracket 34 in position on the frame member 12. A bolt 48 extends through the bracket, a bushing 50 being positioned between the sidewalls 42 and 44 of the bracket to prevent collapse of the same upon tensioning of the bolt 48.

As best shown in FIG. 5, the forward end portion 54 of the subframe member 28 is flat sided and is provided with an opening to receive the bolt 48. A bushing 52 of slightly greater length than the width of the portion 54 is preferably positioned in such opening to provide free pivotal movement of such member about the bolt. A washer or other spacer element 56 is placed between the end portion 54 and the bracket 34 to provide clearance between the heads of the bolts 46 and the end portion 54. A nut 57 secures the frame member 28 upon the bolt. The subframe is easily detached from the frame 12 of the scooter simply by removing the nut 57 from the pivot bolt 48. The bracket 32 is similarly constructed and secured to the appropriate subframe member 26.

Each of the side members 26, 28 is made in two hingedly connected parts, including a forward portion 60 including the forward end portion 54 attached to the scooter frame by the brackets 32, 34 as described above and another, tubular portion 62 integral with the U-shaped member 30. The idler wheel 22 is mounted between the opposite frame portions 62 on an axle shaft 64 each extended end of which is secured to a half sleeve 66 on the underside of the tubular side member portion 62 by a bolt 68.

As shown most clearly in FIG. 6, the free end of each tubular portion 62 fits snugly within the channel shaped rear part of the corresponding forward side member portion 60 and is hingedly attached to the same by a single hinge bolt 70. When the scooter is in operation the tubular and channel portions 60 and 62 of each side member are clamped rigidly in alignment with one another, as shown in FIGS. 1 and 4, by a releasable clamping means, in this instance a conventional band clamp 72, which is spaced rearwardly of the hinge bolt 70. The clamp 72 includes a laterally slotted metal band 74, which is drawn tightly about both the channel portion 60 and the tubular portion 62 by a clamp screw 76. As best shown in FIG. 7, both side walls of the channel portion 60 are notched adjacent their rearward ends where the band 74 clamps the two side member portions 60, 62 together in order that such band firmly engages the tubular portion 62. It is preferable for maximum rigidity of the side member 28 for each channel portion 60 to open downwardly so that the overlapping end of the tubular portion 62 bears against the base of the channel during normal operation of the scooter.

Referring now to FIG. 7, when the band clamp 40 is released from clamping engagement with both portions of each side member, such side member may be collapsed upwardly at its hinge connection thereby enabling the idler wheel 22 to be drawn toward the rear scooter wheel 16 for easy mounting and removal of the endless crawler element 24. Also for this purpose the crawler element is detachably connected together by any suitable means. The illustrated connecting means includes a pair of mating hinge plates 80, 82, which are attached by rivets or other suitable means one to each of the opposite ends of the crawler element 24 as shown in FIGS. 2 and 5, and a hinge pin 84 connecting the two plates together.

In mounting the tread 24, about the rear scooter wheel 16 and idler wheel 22, the subframe is collapsed to the position illustrated in FIG. 7. Then, after the tread has been trained about such wheels and the ends of such tread have been attached together, the front and rear portions of both side members are brought into alignment with one another and clamped in position, by the clamps 72, thereby inducing tension in the crawler element. If desired, several series of bolt holes 86 may be provided along one of the two portions 60, 62 adjacent the hinge connection between such portions for adjusting the length of the subframe 20 and thus the tension in the crawler element 24.

Having illustrated and described a preferred embodiment of the invention, it should be apparent to those skilled in the art that the invention permis of modification in arrangement and detail. I claim as my invention all such modifications as come within the true spirit and scope of the appended claims.

I claim:

1. A land vehicle having a frame and a driven rear wheel, a crawler unit comprising a subframe including a pair of elongate side members, means mounting side members on said vehicle frame, one on each of opposite sides of said rear wheel for pivotal movement about an axis parallel to the axis of rotation of said rear wheel and positioned above said axis of rotation, an idler wheel rotatably mounted on said subframe between said side members and rearwardly of said rear wheel, and an endless, flexible crawler element trained about said idler wheel and said rear wheel.

2. A crawler attachment for a land vehicle having a frame and a driven rear wheel, said attachment comprising a subframe including a pair of elongate side members, means for mounting said side members on said frame one on each of opposite sides of said rear wheel for pivotal movement about an axis parallel to the axis of rotation of said rear wheel but positioned above said axis of rotation, an idler wheel rotatably mounted on said subframe rearwardly of said rear wheel, and an endless crawler element for extending about said idler wheel and said rear wheel.

3. A crawler attachment for a land vehicle having a frame and a driven rear wheel, said attachment comprising a subframe, including a pair of side members, a pair of bracket means pivotally connected one to each of said side members, including means for fixedly securing said bracket means in a predetermined position to said vehicle frame, one on each side of said rear wheel so that said side members pivot about an axis spaced above the axis of rotation of said rear wheel, an idler wheel rotatably mounted on said subframe, and an endless crawler element adapted to be mounted on and to extend about said rear wheel and said idler wheel.

4. An attachment as set forth in claim 3 wherein said side members each comprises a pair of hingedly connected portions and clamping means for releasably clamping said portions rigidly in alignment with one another to prevent hinging action thereof.

5. An attachment according to claim 4 wherein one of said portions includes a channel member and the other of said portions includes a tubular member, and an end portion of said tubular member fits within and is hingedly connected to said channel member, said clamping means being a band clamp encompassing both said channel member and said tubular member at a position spaced from the hinge connection of said members.

6. An attachment according to claim 3 wherein said crawler element includes means for detachable connecting together the ends thereof, said means including a pair of hinge plates attached one to each of said ends, and a hinge pin adapted for insertion through both said plates for holding the same together.

7. An attachment for a land vehicle having a frame and a driven rear wheel mounted thereon, said attachment comprising a subframe including a pair of elongate side members, each including a pair of substantially straight, hingedly connected portions, releasable clamping means for clamping said portions of each said side member rigidly in alignment with one another, a pair of bracket means pivotally connected one to one of said portions of each side member, each of said bracket means including means for fixedly securing the same in a predetermined position on said vehicle frame, one on each side of said rear wheel, so that said one portion of each side member pivots about an axis spaced above the axis of rotation of said rear wheel, with said side members extending generally horizontally and rearwardly of said vehicle, an idler wheel rotatably mounted between the other of said side member porions, at a position rearwardly of said hinge connection between said portions, an inverted U shaped subframe portion joined at its ends to said other side member portions rearwardly of the axis of rotation of said idler wheel and extending angularly upwardly and over said idler wheel, and an endless, but detachably connected together, crawler element for mounting on and about said rear wheel and said idler wheel.

References Cited by the Examiner

UNITED STATES PATENTS

| | | | |
|---|---|---|---|
| 2,739,017 | 3/56 | Arps | 305—35 |
| 3,101,805 | 8/63 | Tritle | 180—9.24 |

FOREIGN PATENTS

| | | |
|---|---|---|
| 548,873 | 10/56 | Italy. |
| 39,543 | 8/24 | Norway. |

ARTHUR L. LA POINT, *Primary Examiner.*